INVENTOR
W. W. FRITSCHI
BY S E Hollander
ATTORNEY

DIAL PULSE REPEATING AND CORRECTING CIRCUIT

United States Patent Office 3,450,843

Patented June 17, 1969

3,450,843

DIAL PULSE REPEATING AND CORRECTING CIRCUIT

Walter W. Fritschi, Seaview Ridge, N.J., assignor to Bell Telephone Laboratories, Incorporated, New York, N.Y., a corporation of New York Filed Nov. 24, 1965, Ser. No. 509,496
Int. Cl. H04m *3/18;* H04q *1/36*
U.S. Cl. 179—16 4 Claims

ABSTRACT OF THE DISCLOSURE

Circuitry is disclosed to reshape direct current input pulses so as to provide pulses conforming to desired minimum "break" and "make" intervals. A pair of relays and their contact sets are arranged so that the first relay is initially responsive to the input pulses and the second relay is responsive to the operation of the first relay. Contacts of the second relay in a holding path for the winding of the first relay inhibit the first relay from releasing until the second relay is operated. This insures a minimum operate, or "make," time for the contacts of the first relay equal to the operate time of the second relay plus the release time of the first relay. The contacts of the two relays are further arranged so that the first relay cannot reoperate until the second relay is released, thereby insuring a minimum "break" interval equal to the release time of the second relay.

This invention relates to dial pulse repeating and correcting circuits and more particularly to pulse repeating and correcting circuits utilizing relay devices.

It is a fundamental attribute of many telephone switching systems that control functions as well as supervisory indications are transmitted in the form of direct current pulses. The common and almost universal use of dial pulses under the control of a calling customer or an operator for extending a connection is an illustration of the prevalence of this type of signaling.

Each so-called dial pulse includes two basic elements referred to as the "make" interval and "break" interval. As used in connection with dial pulsing the "make" interval encompasses the period of time during which the dial pulse contacts are closed, whereas the "break" interval refers to the period of time during which the dial pulse contacts are open. A particular train of dial pulses is designed, on generation, to conform to certain minimum intervals for both the "break" portion and "make" portion of a dial pulse. For example, if a dial pulse rate of 12.5 pulses per second is assumed, the ratio of "break" duration to "make" duration may be 50 milliseconds to 30 milliseconds for each 80 millisecond pulse.

Since it is frequently necessary throughout the existing telephone plant for electromechanical equipment, for example, step-by-step selectors, to respond directly to the dial pulsing, certain minimum constraints on the ratio of the "break interval" to the "make" interval must be observed. It is apparent from the nature of step-by-step equipment and the mechanical inertia, as well as electrical delay inherent therein, that a dial pulse with an unacceptably short "make" interval may fail to actuate the remote switching equipment. Analogously, a dial pulse having a "break interval" which is below acceptable limits may not result in the desired release of the remote switching equipment. Instead, the inertia of the remote equipment may be such as to prevent the equipment from fully releasing prior to the initiation of a subsequent "make interval" of the next succeeding pulse.

The necessity for maintaining appropriate minimum intervals for both the "break" and "make" portions of a dial pulse is thus apparent.

Unfortunately, although dial pulse governors in substations may be adapted to yield relatively uniform dial pulses having desirable "break"/"make" ratios, the characteristics of the circuitry for transmitting these pulses to the remote switching equipment, as well as the parameters of the switching equipment and associated relays, are such that an initially acceptable or even ideal dial pulse becomes distorted and modified in time duration as well as "break"/"make" ratio by passage through inductive and capacitive impedances.

While the above discussion assumes that the initial dial pulses are uniform in character, it is well known that the dial pulse governors in conventional substations are subject to variations in uniformity of dial pulse interval as well as "break"/"make" ratio. Moreover, where a customer in dialing does not permit the dial wheel to rotate freely under its own spring pressure during the return portion of the dial wheel travel, interference with the dial pulsing speed and possibly the "break"/"make" ratios is, of course, possible.

In the past, efforts to overcome the difficulties encountered in repeating and correcting pulses sometimes necessitated the use of complex circuitry the expense of which and the maintenance for which detracted in part from the advantages inherent in the use of such pulse correctors.

It is therefore an object of this invention to provide for the repetition of incoming pulses.

Another object of this invention is to provide for a predetermined selected "break" interval for each incoming pulse during dial pulsing.

Still another object of this invention is to provide for a predetermined minimum "make" (closed loop) interval during dial pulsing.

These and other objects and features of the invention may be achieved in one specific illustrative embodiment which uses two bistable elements which illustratively may be relays for both "break" and "make" period correction. Contacts on the second relay provide a hold path for the winding of the first relay in a manner which precludes the first relay from being released until the second relay is operated. This procedure insures that the contacts of the first relay will remain operated after having once operated for a "make" period equal to the operate time of the second relay plus the release time of the first relay.

The "make" interval encompasses two distinct transitions. Initially, the first relay, having once operated, is rendered temporarily independent of the incoming pulses over a hold path including normally closed contacts of the second relay. This arrangement minimizes the effect of momentary interruptions or "chatter" in the incoming pulses.

When the second relay operates in response to the operation of the first relay, the hold path is discontinued and the first relay returns to the control of the incoming pulses. When the "make" portion of the incoming pulse terminates, the first relay releases, and in turn releases the second relay. Thus the minimum time during which the contacts of the first relay are closed is equal to the time during which the first relay is temporarily independent of the incoming pulse (the operate time of the second relay) plus the release time of the first relay.

Moreover, the interconnection between the relays and contacts is such that the first relay upon release cannot reoperate until the release of the second relay. In this manner a "break" interval, which at its minimum is equal to the release time of the second relay, is also insured.

These and other objects and features of the invention may be more readily comprehended in an examination of the following specification, appended claims and attached drawing in which:

Figure 1:
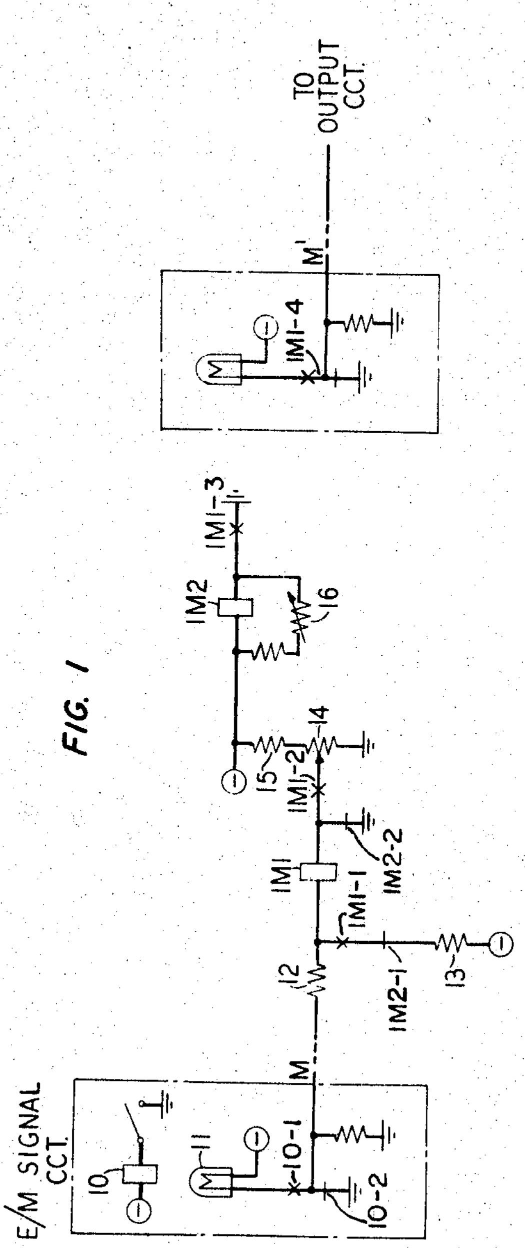
FIG. 1 shows one specific illustrative embodiment of applicant's invention as an "M" lead pulse corrector for use in "E" and "M" signaling.

Referring now to FIG. 1, it is seen that relay 1M1 and relay 1M2 comprise the two relays utilized for both "make" and "break" correction. The input from battery and ground over contacts 10–1 and 10–2 to lead M may be from any "E" and "M" signaling circuit. For a description of this well-known signaling system reference may be made to an article of C. Breen and C. A. Dahlbom, volume 39, Bell system Technical Journal, November 1960, at page 1381.

When a trunk having "E" and "M" signaling is seized at the originating end, battery is applied over the M conductor and the normally open contacts 10–1. Thereupon, a path may be traced from negative battery, resistance lamp 11, contacts 10–1 of relay 10, conductor M, resistance 12, winding of relay 1M1, contacts 1M2–2 of relay 1M2 to ground. The operation of relay 1M1 completes a holding path from negative battery, resistance 13, contacts 1M2–1 of relay 1M2, contacts 1M1–1 of relay 1M1, winding of relay 1M1, contacts 1M2–2 of relay M2 to ground. Moreover, an alternate path is extended through potentiometer 14 to ground over contacts 1M1–2 of relay 1M1.

Relay 1M2 is operated over an obvious path including contacts 1M1–3 of relay 1M1. Until relay 1M2 operates, however, a holding path to battery for relay 1M1 extends over resistance 13, and contacts 1M2–1 and 1M2–2 of relay 1M2. It is apparent, therefore, that the contacts of relay 1M1 having once operated will remain operated for a period of time equal at least to the sum of the operate time of relay 1M2 and the release time of relay 1M1. Thus, contacts 1M1–4 of relay 1M1 apply a battery potential to conductor M' to the output circuit for the same predetermined interval. Under these conditions relay 1M1 will remain operated even though the closure of contacts 10–1 is less than the predetermined minimum "make" interval. Moreover, the effect of contact chatter on conductor M is minimized since the operation of relay 1M1 and the closure of the hold path through resistance 13 renders relay 1M1 temporarily independent of lead M.

When relay 1M2 operates, relay 1M1 now depends for its continued operation on battery through contacts 10–1. Therefore, if conductor M is still connected to battery over resistance lamp 11, both relays 1M1 and 1M2 will remain operated.

At this time a path may be traced from negative battery, resistance lamp 11, contacts 10–1, conductor M, resistance 12, winding of relay 1M1, contacts 1M1–2 of relay 1M1, potentiometer 14 to ground.

When the M lead reflects an on-hook condition, as indicated by the opening of contacts 10–1, a path may be traced from ground, normally closed contacts 10–2, conductor M, resistance 12, winding of relay 1M1, contacts 1M1–2 of relay 1M1, potentiometer 14, resistance 15 to negative battery. It will be noted that current will flow through relay 1M1 in a direction opposite to that for operating the relay. The reverse current flow is designed to collapse the magnetic field quickly but to prevent sufficient reverse current to reoperate the relay.

As indicated above, it is essential that the timing relay 1M1 respond to "break" intervals of various lengths by delivering a uniform "break" interval to conductor M' at contacts 1M1–4 of relay 1M1. The "break" intervals are reflected on conductor M as momentary ground intervals over normally closed contacts 10–2. On the first return to ground on conductor M, relay 1M1 releases in the manner explained above causing the contacts of relay 1M1 to open its own operating path and also the operate path of 1M2. The latter relay has been made slow-to-release through the use of potentiometer 16. Consequently, since contacts 1M2–2 of relay 1M2 which connect ground to the right-hand winding of relay 1M1 are still open, relay 1M1 must remain released until relay 1M2 releases and closes the normally closed contacts of relay 1M2. This condition obtains even though conductor M may have already returned to the battery condition over contacts 10–1. Consequently, a guaranteed minimum output "break" interval is produced.

Figure 2:
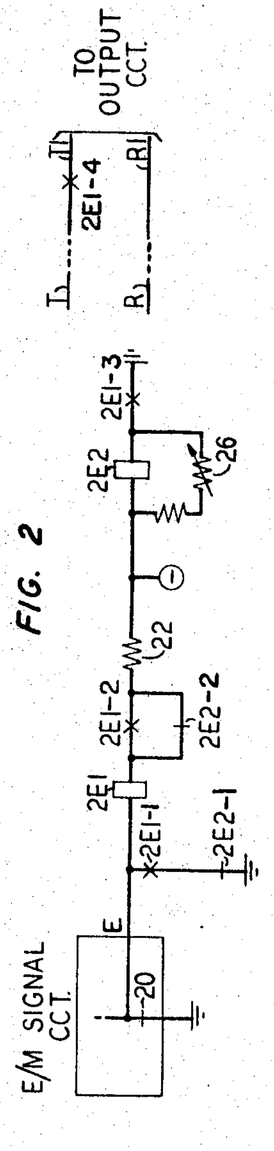
FIG. 2 shows an embodiment of applicant's invention in combination with an "E" and "M" signaling circuit for "E" lead pulse correction.

Referring now to FIG 2, it is seen that the arrangement is shown in combination with a pulse corrector for use as an "E" lead pulse corrector. In this arrangement contacts 20 are closed upon seizure or an off-hook condition and opened on the advent of a release or on-hook condition. Initially, in response to the release of contacts 20, a path may be traced from negative battery, resistance 22, contacts 2E2–2 of relay 2E2, winding of relay 2E1, conductor E, contacts 20 to ground. Operation of relay 2E1 completes a holding path which may be traced from negative battery, resistance 22, contacts 2E1–2 of relay 2E1, winding of relay 2E1, additional contacts 2E1–1 of relay 2E1, contacts 2E2–1 of relay 2E2 to ground.

Thus, again, relay 2E1 having once operated will remain operated for a predetermined period of time as shown herein independent of the operation or release of contacts 20. The operation of relay 2E1 provides an operating path for relay 2E2 which may be traced from negative battery, winding of relay 2E2, contacts 2E1–3 of relay 2E1 to ground. When relay 2E2 is operated, relay 2E1 is again dependent for continued operation on contacts 20 of the E and M signaling circuit. Thus, when an on-hook condition is evidenced by the opening of contacts 20, relay 2E1 releases and in turn causes the release of relay 2E2. However, relay 2E2 is designed as a slow-to-release relay through the use of potentiometer 26. Consequently, relay 2E1 cannot be reoperated even though contacts 20 have reclosed until relay 2E2 is released in view of the normally closed contacts of relay 2E2 in series with resistance 22.

Moreover, contacts 2E1–4 of relay 2E1 connected to the output circuit will remain closed after relay 2E1 has once been operated for a period equal to the time required to operate relay 2E2 plus the time required to release relay 2E1.

Figure 3:
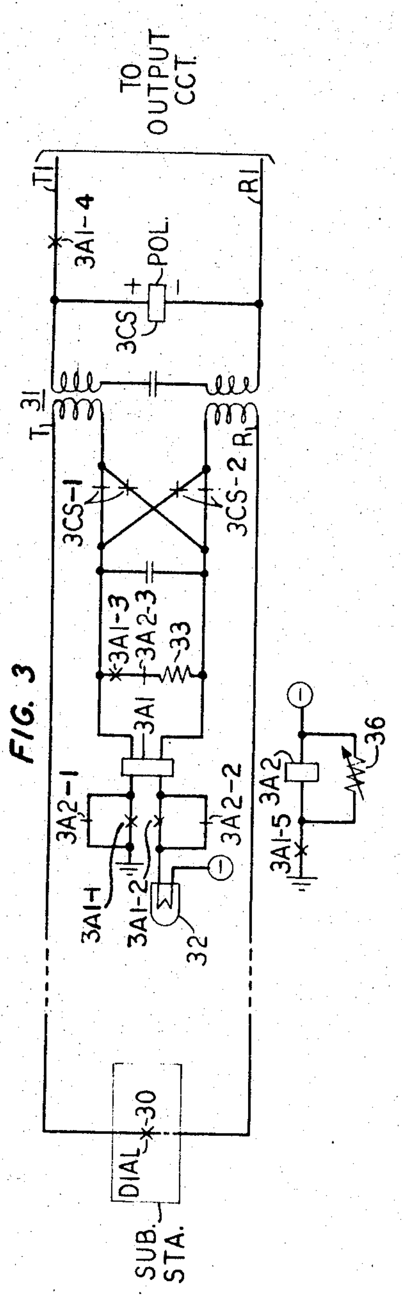
FIG. 3 shows an embodiment of applicant's invention in combination with a loop signaling circuit.

FIG. 3 illustrates the manner in which the arrangement may be used in combination with a loop input pulse corrector. As shown in FIG. 3, when the dial contacts 30 are closed a path may be traced from ground, contacts 3A2–1 of relay 3A2, upper winding of relay 3A1, back contacts 3CS–1 of relay 3CS, transformer 31, conductor T, contacts 30, conductor R, lower winding of transformer 31, back contacts 3CS–2 of relay 3CS, lower winding of relay 3A1, contacts 3A2–2 of relay 3A2, resistance lamp 32 to negative battery. Relay 3A1 is operated over this path and causes the operation of relay 3A2 over an obvious path. The operation of relay 3A1 closes the loop to the called end. Thereafter, relay 3CS reverses battery and ground for supervisory and charging purposes in accordance with conventional practice under control of the called end. Here again, it will be noted that the operation of relay 3A1 establishes a holding path which is independent of contacts 30. This path may be traced from ground, contacts 3A1–1 of relay 3A1, upper winding of relay 3A1, contacts 3A1–3 of relay 3A1, contacts 3A2–3 of relay 3A2, resistance 33, lower winding of relay 3A1, contacts 3A1–2 of relay 3A1, resistance lamp 32 to negative battery. Thus, having once operated, relay 3A1 remains operated over its own contacts. Moreover, when relay 3A2 is operated, the hold path just described is interrupted and relay 3A1 is again dependent on contacts 30 for its continued operation.

When contacts 30 are released, relay 3A1 releases and in turn causes the release of relay 3A2 which is slow-to-release in consequence of potentiometer 36 thereacross. Moreover, relay 3A1 cannot be reoperated until relay 3A2 is fully released in view of the normally closed contacts of relay 3A2 in series with the operate path thereof. When relay 3A1 releases, loop current to the distant (or called end) is removed—i.e., the loop opens.

Here again, the "make" condition of the circuit or the period during which the contacts of relay 3A1 are operated is at least equal to the time required to operate relay 3A2 plus the time required to release relay 3A1.

Figure 4:
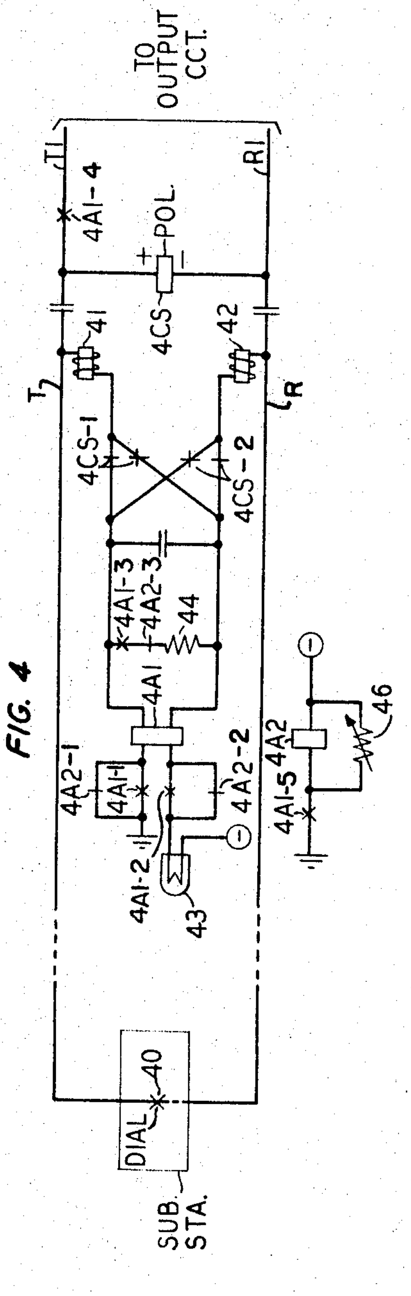
FIG. 4 shows an embodiment of applicant's invention in combination with a loop signaling circuit on bridged impedance trunks.

Referring now to FIG. 4, applicant's arrangement is shown in combination with a loop input pulse corrector for use with bridged impedance trunk circuits. Contacts 40 are closed upon seizure or on an off-hook condition and periodically during dialing. A path may be traced from ground, contacts 4A2–1 of relay 4A2, upper winding of relay 4A1, back contacts 4CS–1 of relay 4CS, winding of inductor 41, conductor T, contacts 40 (when closed), conductor R, winding of inductor 42, back contacts 4CS–2 of relay 4CS, lower winding of relay 4A1, contacts 4A2–2 of relay 4A2, resistance lamp 43 to negative battery. Relay 4A1 is operated over this path and completes an obvious path for the operation of relay 4A2. As before, the operation of relay 4A1 effects a holding path which is independent of contacts 40. This path may be traced from ground, contacts 4A1–1 of relay 4A1, upper winding of relay 4A1, contacts 4A1–3 of relay 4A1, contacts 4A2–3 of relay 4A2, resistance 44, lower winding of relay 4A1, contacts 4A1–2 of relay 4A1, resistance lamp 43 to negative battery.

When relay 4A2 is operated, this hold path is interrupted and relay 4A1 is again dependent on contacts 40.

However, contacts 4A1–4 of relay 4A1 in series with relay 4CS and the output circuit will remain operated having once operated for a period equal at minimum to the sum of the operate time for relay 4A2 and the release time of relay 4A1. As before, relay 4CS is controlled by battery reversals from the called end to reverse the polarity of the loop conductors.

Moreover, when the contacts 40 are opened relay 4A2 which is slow-to-release in view of potentiometer 46 prevents relay 4A1 from being reoperated until relay 4A2 is fully released in view of the contacts of relay 4A2 in the operate path thereof.

It is to be understood that the above-described arrangements are illustrative of the application of the principles of the invention. Numerous other arrangements may be devised by those skilled in the art without departing from the spirit and scope of the invention.

What is claimed is:

1. A pulse correcting circuit comprising:
a source of input pulses;
a first relay;
a second relay;
means devoid of contacts of said relays for connecting said source to said first relay, said first relay operating responsive to receipt of one of said input pulses;
first means responsive to operation of said first relay for establishing a holding path for said first relay;
second means responsive to operation of said first relay for operating said second relay;
means responsive to operation of said second relay for breaking said holding path and for restoring said first relay to the sole control of said one of said input pulses; and
output means enabled during the operation of said first relay for providing an output pulse having a minimum duration equal to the operate time of said second relay plus the release time of said first relay.

2. A pulse correcting circuit in accordance with claim 1, wherein said holding path includes a normally open contact set of said first relay and a normally closed contact set of said second relay.

3. A pulse correcting circuit in accordance with claim 2, wherein said output means includes a contact set of said first relay.

4. A pulse correcting circuit in accordance with claim 1, further comprising a normally closed contact set of said second relay connected to said first relay for inhibiting the reoperation of said first relay until after said second relay has released, whereby successive output pulses are separated by at minimum the release time of said second relay.

References Cited

UNITED STATES PATENTS

| | | | |
|---|---|---|---|
| 1,831,730 | 11/1931 | Ahlberg | 179—16 |
| 2,348,198 | 5/1944 | Evans et al. | 179—16 |
| 3,258,615 | 6/1966 | Bouty | 317—140 |

KATHLEEN H. CLAFFY, *Primary Examiner.*

D. L. RAY, *Assistant Examiner.*

U.S. Cl. X.R.

307—106, 267